United States Patent [19]
Konrath et al.

[11] Patent Number: 5,323,609
[45] Date of Patent: Jun. 28, 1994

[54] EXHAUST SYSTEM FOR ARMORED VEHICLES

[75] Inventors: Rainer Konrath, Kassel; Terens M. Smith, Grebenstein, both of Fed. Rep. of Germany

[73] Assignee: Thyssen Industrie AG, Essen, Fed. Rep. of Germany

[21] Appl. No.: 7,545

[22] Filed: Jan. 22, 1993

[30] Foreign Application Priority Data

Jan. 28, 1992 [DE] Fed. Rep. of Germany ....... 4202232

[51] Int. Cl.$^5$ .......................... F01N 7/00; B60K 13/04
[52] U.S. Cl. ...................................... 60/324; 180/309
[58] Field of Search .................. 60/324; 180/296, 309

[56] References Cited

U.S. PATENT DOCUMENTS

| | | | |
|---|---|---|---|
| 1,447,004 | 2/1923 | Anthon | 180/309 |
| 4,069,668 | 1/1978 | Oldberg | 60/317 |
| 4,773,215 | 9/1988 | Winberg | 60/324 |

FOREIGN PATENT DOCUMENTS

| | | |
|---|---|---|
| 3911142 | 4/1969 | Fed. Rep. of Germany . |
| 2130757 | 6/1971 | Fed. Rep. of Germany . |
| 3221378 | 6/1982 | Fed. Rep. of Germany . |

*Primary Examiner*—Douglas Hart
*Attorney, Agent, or Firm*—Robert W. Becker & Associates

[57] ABSTRACT

For reducing IR detectability of an armored vehicle propelled by an internal combustion engine, the exhaust system includes a muffler connected to the internal combustion engine and an exhaust line connected to the muffler and opening into the atmosphere. The exhaust line branches into a first line and a second line whereby the first line has at least one opening within the bottom of the vehicle and the second line has an opening within one of the outer surfaces of the vehicle other than the bottom of the vehicle. A first flap closes the at least one opening within the bottom of the vehicle. A second flap closes the opening within one of the outer surfaces of the vehicle other than the bottom of the vehicle. In extreme situations, for example, when touching the ground surface, an undesirable increase of the exhaust gas counter pressure and thus an output reduction of the internal combustion engine is prevented by exhausting the gases through the second line, thereby partially loosing the IR detectability protection provided by the system.

4 Claims, 4 Drawing Sheets

EXHAUST SYSTEM FOR ARMORED VEHICLES

BACKGROUND OF THE INVENTION

The present invention relates to an exhaust system of an internal combustion engine of armored vehicles for reducing IR detectability.

It is known from German Offenlegungsschrift 39 11 142 for armored vehicles with exhaust gas outlets arranged at the longitudinal sides of the armored vehicle to mix the hot exhaust gas of the internal combustion engine with the waste air of the cooling device in order to reduce the temperature of the exhaust gases.

However, since the temperature of the waste air of the cooling device is already substantially higher than the surrounding atmospheric temperature the mixing of the hot exhaust gases with the waste air of the cooling device always results in an increase of the temperature within the area of the exhaust gas outlets and thus in temperature differentials which allow IR detectability.

This holds also true for the exhaust system of an armored vehicle according to German Offenlegungsschrift 21 30 757 in which a mixing of the hot exhaust gases of the internal combustion engine with the waste air of the cooling device takes place outside of the vehicle at the rear, whereby the hot exhaust gases guided in the transverse direction of the vehicle are mixed with the waste air of the cooling device that exits in the longitudinal direction of the vehicle.

In order to reduce the IR detectability of armored vehicles operated with internal combustion engines, it is desirable to prevent direct visibility from the sides or the top of exhaust gas outlets at the vehicle shell that are hot during operation. This is, for example achieved by guiding the exhaust gases of the internal combustion engine in a downward direction through the bottom of the vehicle shell.

Exhausting exhaust gases of internal combustion engines through openings at the bottom of the vehicle shell of an armored vehicle is already known from German patent 32 21 378. The hot exhaust gases mixed with the warm air to be removed from the enclosed engine compartment is guided into the atmosphere through an exhaust gas channel covering a great portion of the bottom of the vehicle shell and through a plurality of openings provided at the bottom of the vehicle shell and covered with grates.

This known exhaust system has the disadvantage that the exhaust gas channel covering a great portion of the bottom with its corresponding vertical extrusion substantially reduces the size of the passenger compartment when considering substantially equal ground clearance and vehicle height. It is furthermore disadvantageous that the passenger compartment is heated from the bottom by the hot exhaust gases. This requires the application of heat insulating materials at the bottom portion which also further reduces the size of the passenger compartment. Also, the mounting of the long torsion bars of the tread roller springs is impeded by the exhaust channel which extends over the greater portion of the bottom. It is also possible that, when the bottom portion of the vehicle touches the ground surface in sandy or muddy terrain, the exhaust outlets arranged at the bottom are completely or partially plugged, and the power output of the internal combustion engine is reduced by the increasing exhaust gas counter pressure within the exhaust system, or, in extreme situations, may be blocked.

It is therefore an object of the present invention to provide an exhaust system for armored vehicles of the aforementioned kind which only minimally reduces the size of the passenger compartment and which, under extreme driving situations, such as contact of the bottom portion of the vehicle with sandy or muddy terrain, prevents an increase of the exhaust gas counter pressure that would otherwise reduce the power output of the internal combustion engine.

BRIEF DESCRIPTION OF THE DRAWINGS

This object, and other objects and advantages from the following specification in conjunction with the accompanying drawings, in which.

SUMMARY OF THE INVENTION

Figure 1:
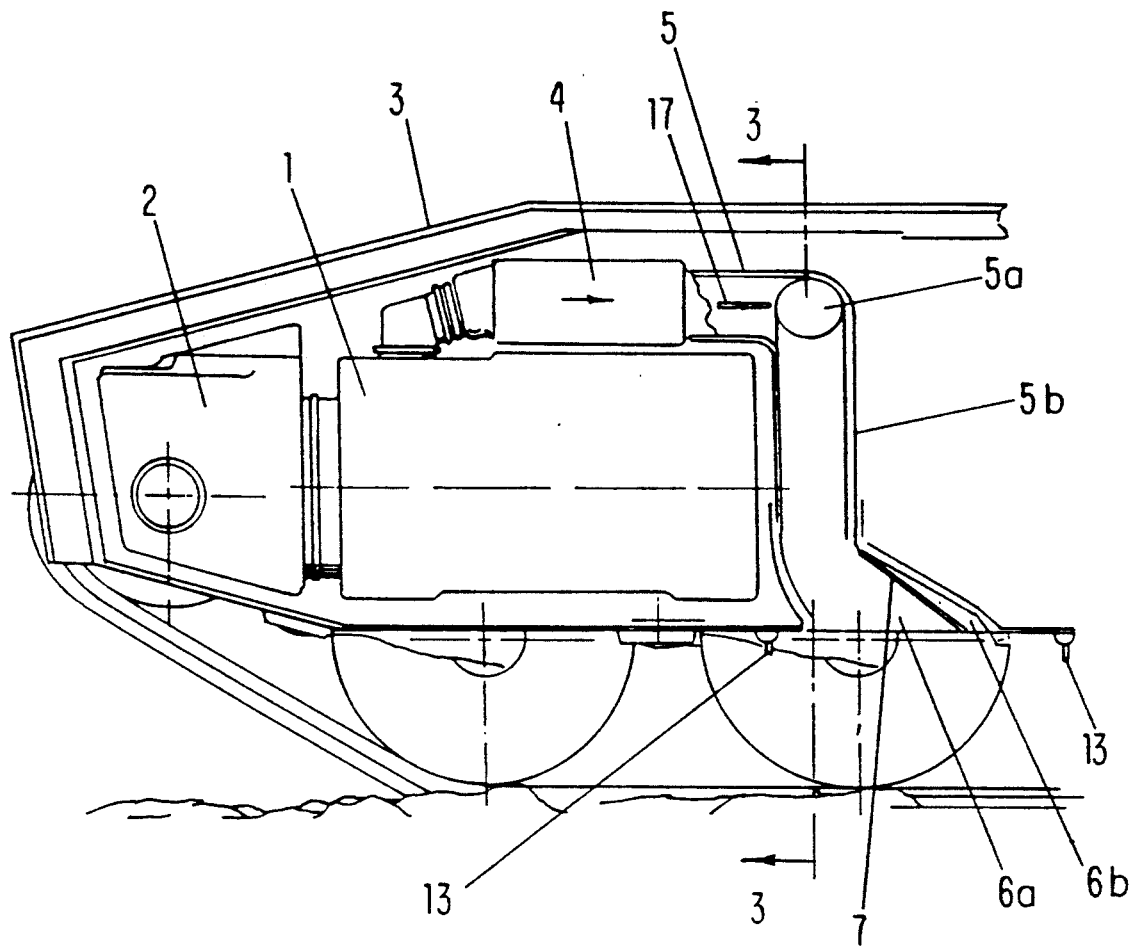
FIG. 1 is a vertical cross-section through the front of an armored tracked vehicle with the exhaust gas flap at the bottom in the open position.

The exhaust system for internal combustion engines of armored vehicles according to the present invention is primarily characterized by: a muffler connected to the internal combustion engine; an exhaust line connected to the muffler and opening into the atmosphere; the exhaust line branching into a first line and a second line; said first line having at least one opening within the bottom of the vehicle; the second line having an opening within one of the outer surfaces of the vehicle other than the bottom of the vehicle; a first flap for closing the at least one opening within the bottom of the vehicle; and a second flap for closing the opening within one of the outer surfaces of the vehicle other than the bottom of the vehicle.

The advantages achieved with the present invention lie primarily in the fact that the armored vehicle during normal operation is provided with an IR detectability protection effective on all sides and from the top and that with the space-savingly arranged, additional and closable exhaust line connected to the atmosphere at the bottom of the vehicle in extreme terrain conditions, for example, contacting of sand or mud, an undesirable increase of the exhaust gas counter pressure is prevented by partly giving up the IR detectability protection in order to maintain the movability of the armored vehicle.

It is furthermore advantageous that guiding the exhaust gases in the downward direction also results in a noise reduction.

The exhaust system of the present invention in a further embodiment is characterized by the first line having two openings within the bottom of the vehicle, the openings being of different sizes and alternately closable by the first flap.

In a further embodiment of the present invention, the exhaust system further comprises a means for closing the first flap and the second flap, the means comprising a pressure sensor for measuring exhaust gas counter pressure and an electronic computing unit connected to the pressure sensor for evaluating the measured exhaust gas counter pressure, with closing positions of the first and the second flaps controllable as a function of the measured exhaust gas counter pressure.

In another embodiment of the present invention, the exhaust system further comprises sensors, for sensing the ground clearance of the vehicle, connected to the electronic computing unit, with the closing positions of the first and the second flaps controllable as a function of the measured ground clearance.

By closing the larger one of the openings at the bottom with the first flap the introduction o greater amounts of sand or mud into the downward extending exhaust line can be prevent ed when required. The smaller one of the openings at the bottom remains open when the greater opening is closed and serves as a drainage opening for water and mud for the exhaust line. The smaller opening also allows the start-up and idling of the internal combustion engine when the greater opening at the bottom and the additional opening provided at an outer surface of the vehicle other than the bottom are simultaneously closed by the first, respectively, the second flap.

The closing positions of the flaps are controlled as a function of the exhaust gas counter pressure measured by the pressure sensor and/or as a function of the ground clearance at the bottom of the vehicle measured by the distance sensor provided at the bottom of the vehicle shell.

DESCRIPTION OF PREFERRED EMBODIMENTS

The present invention will now be described in detail with the aid of several specific embodiments utilizing FIGS. 1 through 4.

The forward portion of an armored track vehicle presented in FIG. 1 has an internal combustion engine 1 with a flanged gear box 2, both supported in a non-represented known manner at the vehicle shell 3. Above the internal combustion engine 1 the muffler 4 is arranged from which the hot exhaust gases are guided into the exhaust line 5. The exhaust line 5 is provided with a valve 17 for deep water fording. The exhaust line 5 has a branch 5a from which a first line 5b extends in a downward direction to an opening within the bottom of the vehicle shell 3 and an additional second line 5c extending laterally to an opening in the longitudinal side wall of the vehicle shell 3. The second exhaust line 5c extending from the branch 5a may also lead to other outer surfaces of the vehicle shell 3 other than the bottom, for example, to t he roof or to the rear wall of the vehicle shell. The branch 5a is shown in detail at B in FIG. 3. The downwardly extending first exhaust line 5b at its downward free end is provided with two adjacent openings 6a and 6b of different sizes which are alternately closable by the flap 7 (FIG. 4). The flap 7 is connected with a link 8 to the piston rod 9 of an actuating cylinder unit 10 which is loaded by a pressure medium from both ends.

The downwardly extending exhaust line 5b is provided with a pressure sensor 11 which is connected via respective lines to the electronic computing unit 12. At the bottom side of the vehicle shell 3 sensors 13 for detecting the distance to the ground surface are provided before and behind the openings 6a and 6b (in the direction of travel) which are also connected via respective lines to the electronic computing unit 12. The electronic computing unit 12 is connected to the control valve 14 of the actuating cylinder unit 10.

Figure 3:
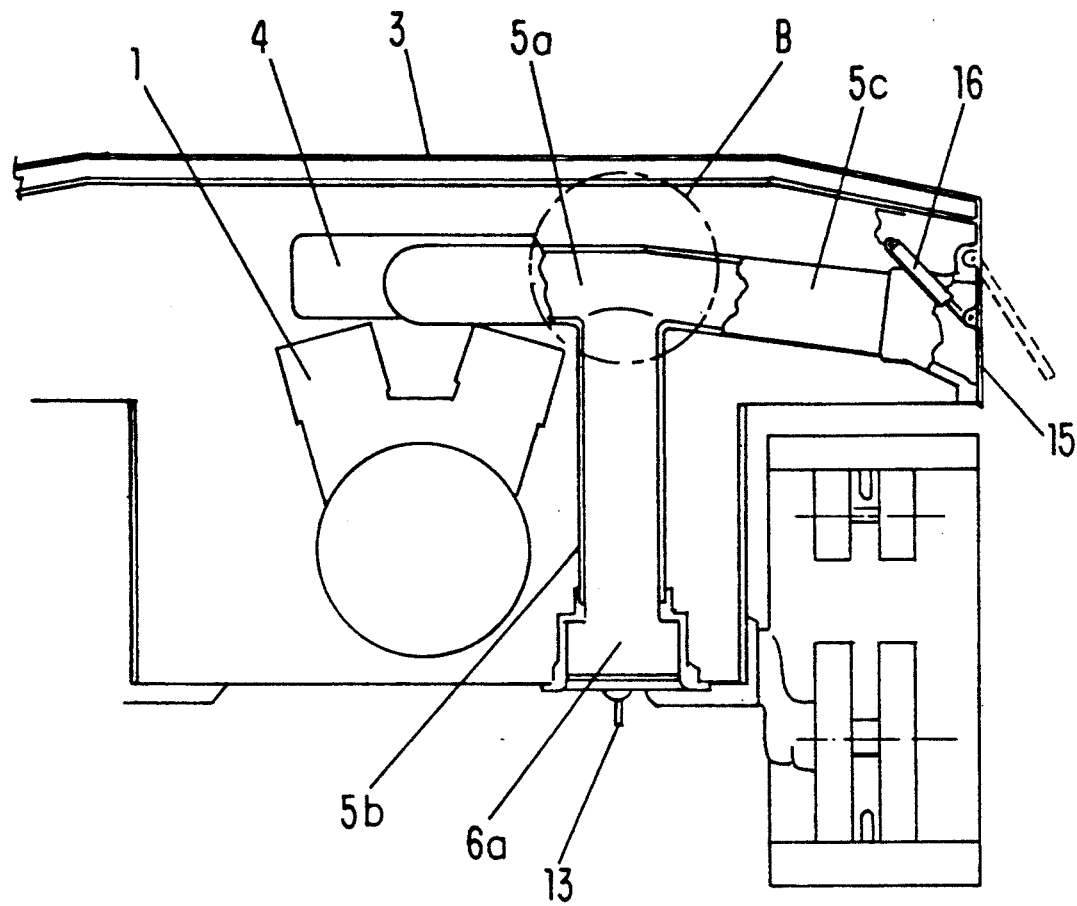
FIG. 3 is a vertical cross-section along the line A—A' of FIG. 1 in the transverse direction of the vehicle.
Figure 4:
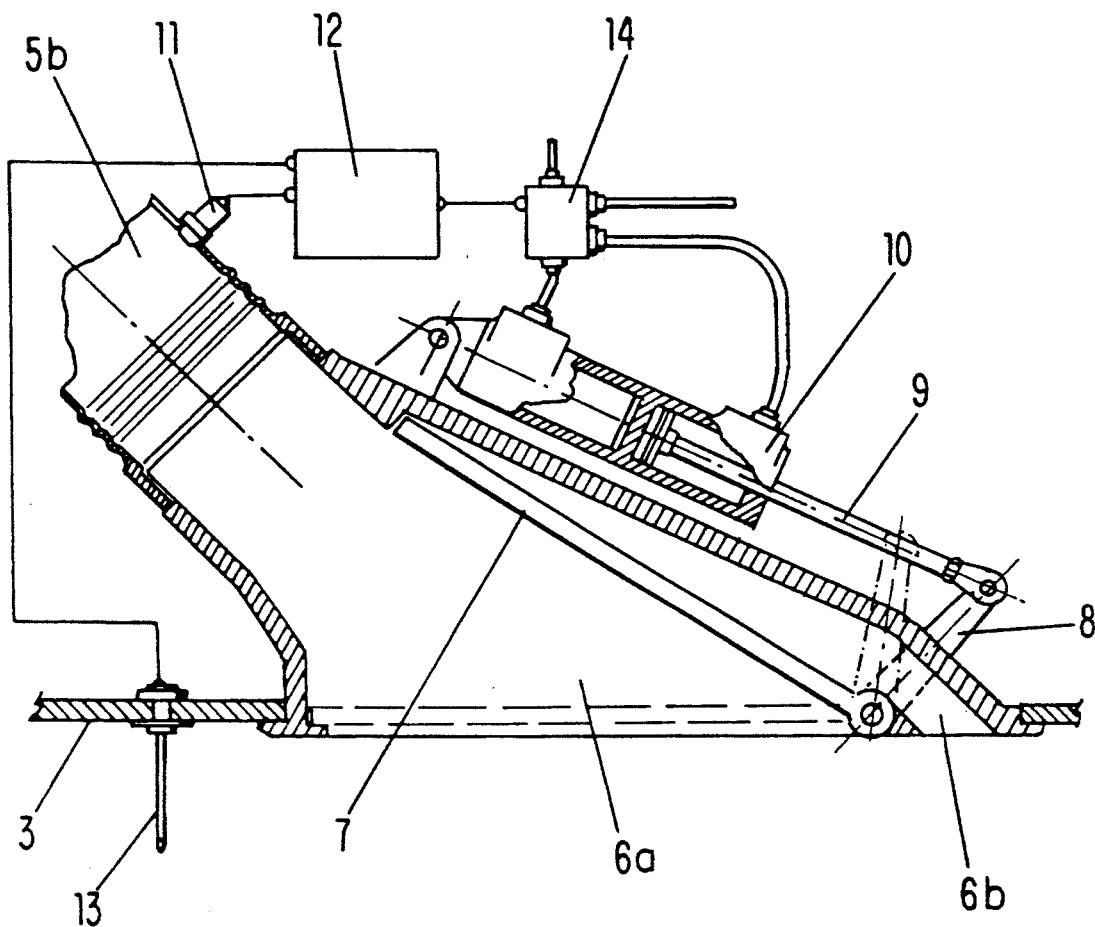
FIG. 4 shows detail B of FIG. 1 in an enlarged and completed representation.

The free end of the second, laterally extending exhaust line 5c is also provided with a flap 15 which is actuatable by a piston-cylinder unit 16, as can be seen in FIG. 3.

The opening 6a of a greater size is closed by the flap 7 when the internal combustion engine is shut off. During the operation of the internal combustion engine, the position and degree of opening of the flap 7 is controlled by the pressure sensor 11 which measures the exhaust gas counter pressure.

Figure 2:
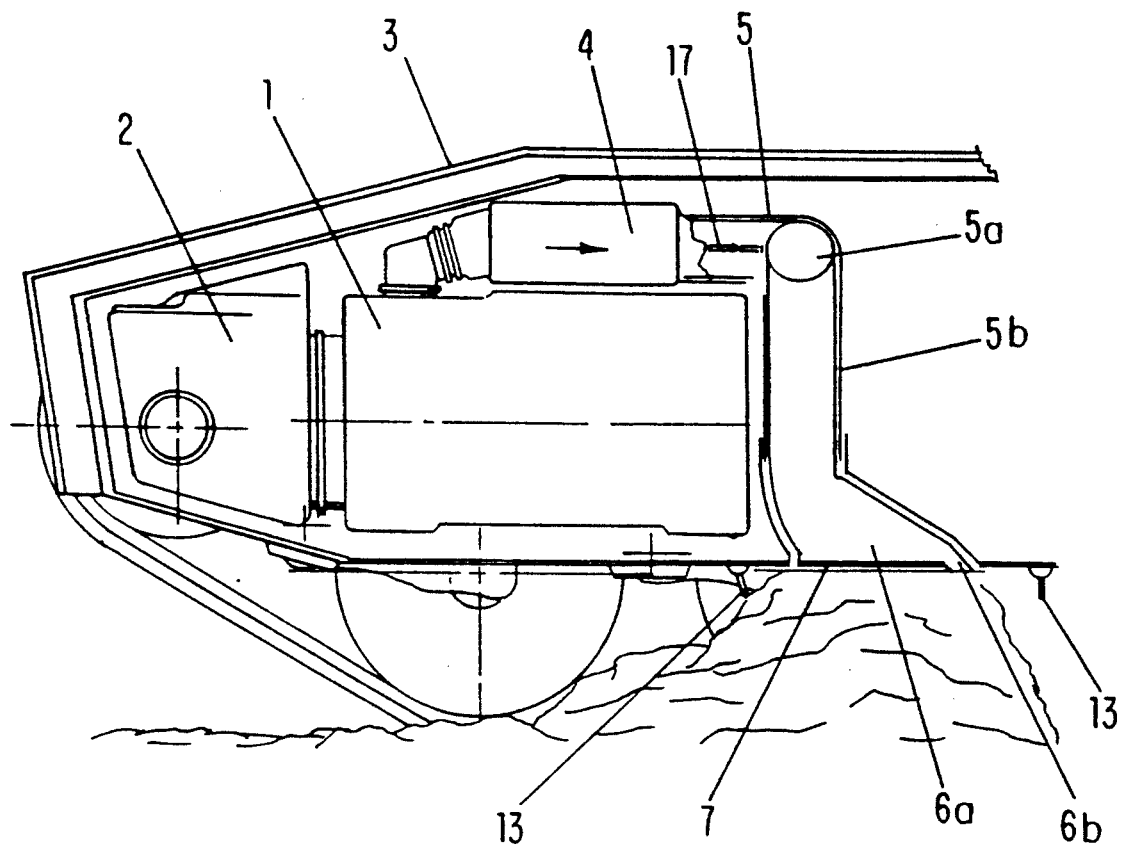
FIG. 2 shows a vertical cross-section corresponding to FIG. 1 with the exhaust gas flap at the bottom in the closed position.

The flap 7 is almost completely closed when the exhaust gas counter pressure is low, i.e., at small amounts of exhaust gas and low flow velocities. However, during such an operational state a free cross-section must remain which prevents an increase of the outflow velocity to a value which is greater than the maximum velocity reached for the maximum amount of exhaust gas and a completely open flap 7. For a high exhaust gas counter pressure, i.e., great exhaust gas amount and high flow velocities, the flap 7 is completely open. When during operation of the internal combustion engine 1 a certain exhaust gas counter pressure is surpassed, for example, by touching the ground surface the flap 7 is closed as represented in FIG. 2. The signal sent by the pressure sensor 11 can simultaneously be used for opening the flap 15 at the free end of the additional second exhaust line 5c with the correspondingly actuated piston-cylinder unit 16. The closing of the flap 7 at the bottom of the vehicle shell 3 during contact with the ground surface (FIG. 2) can also be achieved or controlled by sensors 13 for detecting the ground clearance which in the direction of travel are arranged before and behind the flap 7 at the bottom side of the vehicle shell 3.

The smaller one of the openings 6b at the free end of the downwardly extending first exhaust line 5b is always open when the opening 6a of a greater size is closed by the flap 7 or when the flap 7 is in an intermediate position For a closed opening 6a the smaller opening 6b, which is in an open position, always provides a free cross-section for the exhaust line so that the start-up and the idling of the internal combustion engine is always possible. Additionally, the smaller opening 6b also serves as a drainage for the exhaust line in the aforementioned situation.

The present invention is, of course, in no way restricted to the specific disclosure of the specification and drawings, but also encompasses any modifications within the scope of the appended claims.

What we claim is:

1. An exhaust system for an internal combustion engine of an armored vehicle for reducing IR detectability, said exhaust system comprising:

a muffler connected to the internal combustion engine;

an exhaust line connected to said muffler and opening into the atmosphere;

said exhaust line branching into a first line and a second line:

said first line having at least one opening within the bottom of the vehicle;

said second line having an opening within one of the outer surfaces of the vehicle other than the bottom of the vehicle;

a first flap for closing said at least one opening within the bottom of the vehicle; and a second flap for closing said opening within one of the outer surfaces of the vehicle other than the bottom of the vehicle.

2. An exhaust system according to claim 1, wherein said first line has two said openings within the bottom of the vehicle, said openings being of different sizes and alternately closable by said first flap.

3. An exhaust system according to claim 2, further comprising a means for closing said first flap and said second flap, said means comprising a pressure sensor for measuring exhaust gas counter pressure and an electronic computing unit connected to said pressure sensor for evaluating the measured exhaust gas counter pressure, with closing positions of said first and said second flaps controllable as a function of the measured exhaust gas counter pressure.

4. An exhaust system according to claim 3, further comprising sensors, for sensing the ground clearance of the vehicle, connected to said electronic computing unit, with said closing positions of said first and said second flaps controllable as a function of the measured ground clearance.

* * * * *